(12) United States Patent
Hottinen et al.

(10) Patent No.: US 7,200,368 B1
(45) Date of Patent: Apr. 3, 2007

(54) TRANSMIT DIVERSITY METHOD AND SYSTEM

(75) Inventors: Ari Hottinen, Espoo (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/221,691

(22) PCT Filed: Mar. 15, 2000

(86) PCT No.: PCT/EP00/02307

§ 371 (c)(1),
(2), (4) Date: Oct. 16, 2002

(87) PCT Pub. No.: WO01/69814

PCT Pub. Date: Sep. 20, 2001

(51) Int. Cl.
*H04B 1/00* (2006.01)
*H04B 7/02* (2006.01)
*H04B 7/00* (2006.01)

(52) U.S. Cl. .......................... 455/101; 455/69; 455/68; 455/562.1; 455/24.25; 455/63.4; 370/334; 370/339; 375/141

(58) Field of Classification Search .................. 455/68, 455/69, 101, 562.1, 24.25, 63.4; 370/334, 370/339, 209, 441; 375/141, 146–148
See application file for complete search history.

(56) References Cited

U.S. PATENT DOCUMENTS 6,131,016 A * 10/2000 Greenstein et al. ........... 455/69

(Continued)

FOREIGN PATENT DOCUMENTS

WO    WO 00/03496    1/2000

(Continued)

OTHER PUBLICATIONS

Hottinen A et al. "Transmit diversity using filtered feedback weights in the FDD/WCDMA System" 2000 International Zurich Seinar on Broadband Communications. Accessing, Transmission, Networking. Proceedings (CAT. No. 00th8475), Proceedings of the Millennium Seminar on Broadband Communications, Zurich, Switzerland, Feb. 15-17, 2000, pp. 15-21, XP002151874.

(Continued)

*Primary Examiner*—Matthew Anderson
*Assistant Examiner*—Yuwen Pan
(74) *Attorney, Agent, or Firm*—Harrington & Smith, PC

(57) ABSTRACT

The present invention relates to a method and system for transmitting in a wireless communication system, a transmission signal divided into at least two signal parts by using transmission beams of at least two subarrays (SA1, SA2) of an antenna array. The transmission beam of at least one of the at least two subarrays (SA1, SA2) is at least in part controlled based on a feedback information received from the receiving means (20). Thus, several beams are generated using an antenna array with more than two antennas, wherein an open-loop diversity is used to split the transmission between the beams, and a closed-loop feedback-based diversity is used to optimize the beams, as well as possibly the division of power between the beams. Thereby, the amount of feedback can be controlled so as to achieve significant feedback gain in a multi-antenna transmission even with non-maximal amounts of feedback.

31 Claims, 3 Drawing Sheets

U.S. PATENT DOCUMENTS 6,594,473 B1 * 7/2003 Dabak et al. ................ 455/101
6,748,024 B2 * 6/2004 Kuchi et al. ................. 375/299
6,816,557 B2 * 11/2004 Kuchi et al. ................. 375/299
2004/0160291 A1 * 8/2004 Antkowiak et al. .......... 333/116

FOREIGN PATENT DOCUMENTS

WO     WO 00/36764     6/2000

OTHER PUBLICATIONS

Raitola M. et al: "Transmission diversity in wideband CDMA" 1999 IEEE 49th Vehicular Technology Conference (CAT. No. 99CH36363), 1999 49th Vehicular Technology Conference. Moving Into a New Millenium Houston, TX USA, May 16-20, 1999, pp. 1545-1549 vol. 2, Xp002151875.

* cited by examiner

| mode | $N_{FB}$ | $N_W$ | feedback bit rate | Na | Np |
|---|---|---|---|---|---|
| STD | 1 | 1 | 1500bps | 1 | 0 |
| TxAA mode 1 | 1 | 2 | 1500bps | 0 | 2 |
| TxAA mode 2 | 1 | 4 | 1500bps | 1 | 3 |

# TRANSMIT DIVERSITY METHOD AND SYSTEM

PRIORITY CLAIM

This is a national stage of PCT application No. PCT/EP00/02307, filed on Mar. 15, 2000. Priority is claimed on that application.

FIELD OF THE INVENTION

The present invention relates to a transmit diversity method and system for a wireless communication system, such as the Universal Mobile Telecommunications System (UMTS) comprising a transmitting element and at least one receiver.

BACKGROUND OF THE INVENTION

Wideband Code Division Multiple Access (WCDMA) has been chosen as the radio technology for the paired bands of the UMTS. Consequently, WCDMA is the common radio technology standard for third-generation wide-area mobile communications. WCDMA has been designed for high-speed data services and, more particularly, Internet-based packet-data offering up to 2 Mbps in indoor environments and over 384 kbps for wide-area.

The WCDMA concept is based on a new channel structure for all layers built on technologies such as packet-data channels and service multiplexing. The new concept also includes pilot symbols and a time-slotted structure which has led to the provision of adaptive antenna arrays which direct antenna beams at users to provide maximum range and minimum interference. This is also crucial when implementing wideband technology where limited radio spectrum is available.

The uplink capacity of the proposed WCDMA systems can be enhanced by various techniques including multi-antenna reception and multi-user detection or interference cancellation. Techniques that increase the downlink capacity have not been developed with the same intensity. However, the capacity demand imposed by the projected data services (e.g. Internet) burdens more heavily the downlink channel. Hence, it is important to find techniques that improve the capacity of the downlink channel.

Bearing in mind the strict complexity requirements of terminals, and the characteristics of the downlink channel, the provision of multiple receive antennas is not a desired solution to the downlink capacity problem. Therefore, alternative solutions have been proposed suggesting that multiple antennas or transmit diversity at the base station will increase downlink capacity with only minor increase of complexity in terminal implementation.

The transmit diversity concept adopted for the FDD (Frequency Division Duplex) mode of third generation WCDMA system in the 3G standardization is currently being optimized for the case of two transmitting antennas at the base station.

In case of a so-called open-loop mode, a space-time block code is applied for the two transmitting antennas. The channel symbols are divided into two-element blocks which are transmitted from a first and second antenna, respectively, at successive time instants. These symbols are transmitted using the same spreading code. The receiver then uses a linear orthogonal processing based on the estimated channel coefficients to detect the transmitted symbols.

Alternatively, in case of a so-called closed-loop mode, a weight information is fed back from the terminals to the base station to approximate matched beamforming. FIG. 1 shows an example of such a closed-loop or feedback mode for a downlink transmission between a base station (BS) 10 and a mobile terminal or mobile station (MS) 20. In particular, the BS 10 comprises two antennas A1 and A2, and the MS 20 is arranged to estimate the channel on the basis of pilot channel signals used to probe the downlink channel and transmitted from the two antennas A1 and A2. Then, the MS 20 feeds back the discretized channel estimate to the BS 10. The antennas (or antenna elements) A1 and A2 are spaced sufficiently close to each other, so that the propagation delays between each of the antennas A1 and A2 and the MS 20 are approximately identical (within a fraction of a duration of a chip of the WCDMA spreading code). This is important in order to maintain downlink orthogonality in a single-path channel. Naturally, it is desired to develop a robust and low-delay feedback signaling concept.

Transmit diversity techniques provide a low-cost solution to increase downlink capacity in third generation systems. A number of different transmit diversity concepts have been developed. Both open and closed-loop concepts have significant merits in different environments and with different service assumptions.

In WCDMA, different modes have been suggested for the closed-loop concept which is optimized for two antennas. In the Selective Transmit Diversity (STD) mode, one bit per time slot is used to signal the "best" antenna from each terminal. The MS 20 estimates channel coefficients from common pilot signals (antenna or beam specific), selects the stronger antenna (two possibilities), and sends the index to the BS 10 using a 1.5 kbps subchannel. Thus, a simple dedicated channel estimate can be derived from continuous common channel estimates. In the STD mode, the bit length of the feedback signaling word is one bit. The feedback bit rate is 1500 bps and the feedback signaling word is used for controlling the power supplied to the antennas A1 and A2.

Furthermore, modes 1 and 2 (referred to as Transmission Antenna Array (TxAA) modes) are suggested with a slower feedback link, where feedback weights used for controlling power and/or phase of the transmission signals of the antennas A1 and A2 are modified after a certain number of slots. In particular, a quantized feedback is signaled to the BS 10 using the 1.5 kbps subchannel. In mode 1, the possible Tx feedback weights are selected from a QPSK constellation. In mode 2, the possible Tx feedback weights are selected from a 16-state constellation.

FIG. 2 shows a table indicating characteristic parameters of the above modes. In particular, $N_{FB}$ designates the number of feedback bits per time slot, $N_W$ the number of bits per feedback signaling word, Na the number of feedback bits for controlling an amplification or power at the antennas A1 and A2, and Np the number of feedback bits for controlling a phase difference between the antennas A1 and A2. As can be gathered from the table of FIG. 2, one bit is fed back per time slot in each of the feedback modes.

In the Tx AA mode 1, the feedback signaling word comprises two bits, and an update is performed after both feedback bits have been received, i.e. after two time slots. The feedback signaling word is only used for controlling the phase difference between the two antennas A1 and A2.

In the Tx AA mode 2, the bit length of the feedback signaling word is four, and an update is performed every four time slots. In particular, one bit of the feedback signaling word is used for controlling the amplification (power)

at the antennas A1 and A2, and three bits are used for controlling their phase difference.

The required channel estimates are obtained e.g. from the common pilot channel signal transmitted with a known power from each antenna. In WCDMA systems, rather accurate estimates can be obtained by using the common channel pilots (CPICH) transmitted continuously from the two antennas A1 and A2. The feedback information can be transmitted in the Feedback Signaling Message (FSM) as a part of the FBI field of the uplink dedicated physical control channel (DPCCH)

It is to be noted that the STD mode may be implemented in an analogous manner in the beam domain. In this case, the MS 20 signals to the BS 10 whether to rotate channel symbols transmitted from the antenna A2 by 180°. In this case, the BS 10 transmits simultaneously from both antennas A1 and A2. Thus, the phase difference between the antennas A1 and A2 is switched between 0° and 180° in response to the feedback value.

In the TxAA modes 1 and 2, the MS 20 transmits estimated and quantized channel parameters to the BS 10 which then weights the transmitted signals accordingly. Thus, a higher resolution than 180° (as provided by the STD mode) can be achieved. The MS 20 selects the Tx weight (or Tx beam) from 4 or 16 different constellations, respectively.

As regards the table of FIG. 2, it is to be noted that an equal power is applied to the antennas A1 and A2 in each case where Na=0. Furthermore, the antennas A1 and A2 are uniquely defined by their respective pilot codes of the CCPCH (Common Control Physical Channel) of the UMTS. The derived amplitude and phase applied to the antennas A1 and A2 is called a weight and the set of weights is grouped into a weight vector. Specifically, the weight vector for the present case of two antennas is given by $$\underline{w} = \begin{bmatrix} \sqrt{PA1} \\ \sqrt{PA2} \cdot \exp(j\pi\Delta\phi/180) \end{bmatrix}$$

wherein $\Delta\phi$ denotes the phase difference (phase weight) fed back to the BS 10. If more than two antennas, i.e. an antenna array, is used, the dimension of $\underline{w}$ becomes larger than two. In this case, a directional antenna may be achieved by using relative phases between antennas. The estimated phase of the feedback signal in the complex plane is then used for controlling the transmit direction.

Both TxAA modes 1 and 2 rely on the use of dedicated pilots. As it is possible that some future frame formats do not include dedicated pilots, the concept of Soft-Weighted Space-Time Transmit Diversity (SW-STTD) was suggested. In SW-STTD, relative weighting factors are imposed on the signals transmitted from the antennas A1 and A2. The stronger antenna (as measured from the CPICH) is set to have the larger weight. The CPICH power ranking can be signaled with 1 bit/slot feedback as specified in A. Hottinen et al, "Transmit diversity by antenna selection in CDMA downlink", Proc. IEEE International Symposium of Spread Spectrum Techniques and Applications (ISSSTA), Sun City, South Africa, September 1998. For optimal reception, the receiver needs to know precisely the weights that are applied at the transmitter. To achieve this, STTD processing is used in decoding the SW-STTD transmission at the terminal, thus applying effectively equal gain combining to the two transmit antennas. Furthermore, the transmit weight may be changed based on two successive feedback commands rather than for each command independently. For example, when the base station estimates feedback bits to be [1 1] or [0 0], the transmit gains are set to [g1 g2], where g1>g2 or g1<g2, respectively. When the successive feedback bits are different, i.e. [1 0] or [0 1], equal power (STTD) transmission is applied, where g1=g2. For simplicity, the actual values of the asymmetric weights may be fixed e.g. to $\sqrt{0.8}$ and $\sqrt{0.2}$, which are applied also in the above TxAA mode 2. The channel estimate is obtained by filtering the CPICH of the two antennas, as in the open-loop mode.

In the IMT-2000 specifications, a two-dimensional space-time code and a closed-loop feedback-based array control are applied as described e.g. by S. M. Alamouti, "A simple transmit diversity technique for wireless communications", IEEE Journal on Selected Areas in Communications, Vol. 16, No. 8, pp. 1451–1458, October 1998. The current concept is defined for a two-element array (at the base station) which does not require any array calibration. The feedback control is signaled from each terminal and individual channel-matched "beams" are transmitted to minimize the transmit power while meeting the signal-to-interference requirements. The gains achievable by the feedback mode are significant (when compared to open-loop or single-antenna transmission) especially in low mobility environments.

Extensions to the above two-element concepts are considered in order to further increase the system capacity in low mobility environments. While many of these extensions are straightforward, most of them are applicable only in very low mobility environments, since the accuracy (or delay) of the feedback signaling is often compromised.

SUMMARY OF THE INVENTION

It is therefore an object of the present invention to provide a method and system for transmit diversity or transmit beamforming, by means of which the system capacity can be increased.

This object is achieved by a method for performing a transmit diversity transmission of a transmission signal via an antenna array to a receiving means of a wireless communication system, said method comprising the steps of: dividing said transmission signal into at least two signal parts;

transmitting said at least two signal parts by using transmission beams of at least two subarrays of said antenna array; and controlling the transmission beam of at least one of said at least two subarrays at least in part based on a feedback information received from said receiving means.

Furthermore, the above object is achieved by an system for performing a transmit diversity transmission of a transmission signal via an antenna array to a receiving means of a wireless communication system, said system comprising:

dividing means for dividing said transmission signal into at least two signal parts;

transmitting means for transmitting said at least two signal parts by using transmission beams of at least two subarrays of said antenna array; and control means for controlling the transmission beam of at least one of said at least two subarrays at least in part based on a feedback information received from said receiving means.

Accordingly the transmission signal is transmitted via several beams using an antenna array with more than two antennas, e.g. at least two subarrays, by dividing the transmission signal into two signal parts to split the transmission between beams. At least one of the beams is optimized based on a feedback received from the receiving end of the wireless communication system. Thereby, open-loop diversity (space-time division of the transmission signal) and closed-loop diversity (feedback-controlled beam) are combined in the transmit diversity concept. The subarrays do not need any sufficient spatial-separation and even do not have to be uncorrelated. The idea is to use three or more transmit elements belonging to the same array, correlated or not, to form two (ore more) beams, which are optimized. Thus, the transmit diversity concept according to the present invention combines feedback signaling and space-time block codes or any other method for dividing signals into two or more parts with a multi-antenna transmission, to thereby achieve a significant feedback gain in the multi-antenna transmission even with non-maximal amounts of feedback. Thereby, the system capacity can be increased without increasing the capacity of the feedback signaling.

Preferably, pilot control means are provided for generating pilot signals transmitted via pilot channels of predetermined antenna elements of the at least one of the at least two subarrays. Thereby, the terminal or mobile station does not need to know the architecture of the transmitter at e.g. the base station, but only receives signals via certain probing or pilot channels. It is then up to the transmitter at the base station to interpret the corresponding feedback signals of the pilot channels correctly. The pilot control means may be arranged to change at least one of the predetermined antenna elements between slots of the transmission signal according to a predetermined hopping pattern. Thereby, the terminal or mobile station is able to measure the channels of all antenna elements based on measurements using only a few (e.g. two) pilot sequences. The hopping pattern may be changed in dependence on the channel characteristics of the transmission channel. For example, in very slowly varying channels, at least one pilot sequence may hop to a different transmitting element after multiple slots, or after each frame. It is to be noted that the terminal does not need to know from which antenna element the pilots are transmitted. Given any pilot hopping pattern, the base station may interpret the received signals in a correct way for each terminal.

Alternatively, the feedback information may be generated based on a channel measurement using pilot channels of each antenna of the at least one of the at least two subarrays, wherein the pilot channels may be code-division-multiplexed channels. Thereby, all downlink channels can be estimated simultaneously, such that feedback delay can be reduced.

The feedback information may comprise M−1 feedback weights used to control the relative weights between M antenna elements of the at least one of the at least two subarrays. In this case, the feedback weights may be filtered after reception at the transmitter. Thus, only a small change is required to the current WCDMA specifications, and the concept can be used without considering any antenna calibration, since only relative weights are used.

Alternatively, the feedback information may be used to determine a transmit direction and/or weight jointly for all elements of the at least one of the at least two subarrays, wherein the same relative phase is used between neighboring antenna elements. Thus, only one coefficient is signaled to the network, which reduces control delay. The relative weight is then used at the transmitting side to control the signals supplied to neighboring transmitting elements.

As a further alternative, the feedback information may comprise a weight information of a part of the antenna elements of the at least one of the at least two subarrays, wherein the weight information of the remaining part of the antenna elements is interpolated. Thus, only a reduced number of feedback parameters are required, since the remaining parameters are obtained by interpolation at the transmission side. Interpolation techniques are very beneficial when the antennas can be assumed to be correlated.

The division of the transmission signal can be performed by using any space-time transmit diversity processing, delay diversity processing, space-time trellis coding, coded substreams or space-time block coding. Thus, optimum transmit weights are calculated regardless of antenna correlation, while low capacity feedback channels may still be used.

Another transmission beam of another one of the at least two subarrays may be correlated to the transmission beam of the at least one of the at least two subarrays. This other transmission beam can then be formed without feedback by using received uplink signals. Thus, the transmission beams are a priori constrained in some particular way. The use of constrained or correlated beams allows to reduce the feedback link capacity and also helps in channel estimation at the terminal.

The at least two subarrays may each comprise two antenna elements one of which being controlled by a feedback weight derived from the feedback information. Thereby, any two-antenna feedback mode can be used to control two subarrays with two elements separately.

The feedback information may be a common feedback calculated based on command pilots. Thus, the feedback can be calculated as a joint feedback command based on the common pilots, to thereby reduced feedback signaling capacity.

The dividing step may be suppressed and the transmission signal may be supplied to the antenna array in order to be transmitted by a single transmission beam, if it is determined that the signals from/to the antenna elements of the antenna array are highly correlated. Thereby, a dynamic mode change can be achieved so as to omit the division into two signal parts in environments where a single beam transmission leads to a sufficient transmission quality.

Furthermore, the at least two subarrays may comprise overlapping subarrays having at least one antenna element which belongs to each of the overlapping subarrays. Thus, one or even all antenna elements of the antenna array may belong to two or more overlapping subarrays, wherein the overlapping subarrays are arranged to generate differently directed beams.

BRIEF DESCRIPTION OF THE DRAWINGS

In the following, a present invention will be described in greater detail on the basis of a preferred embodiment with reference to the accompanying drawings, in which.

DESCRIPTION OF THE PREFERRED EMBODIMENT

Figure 3:
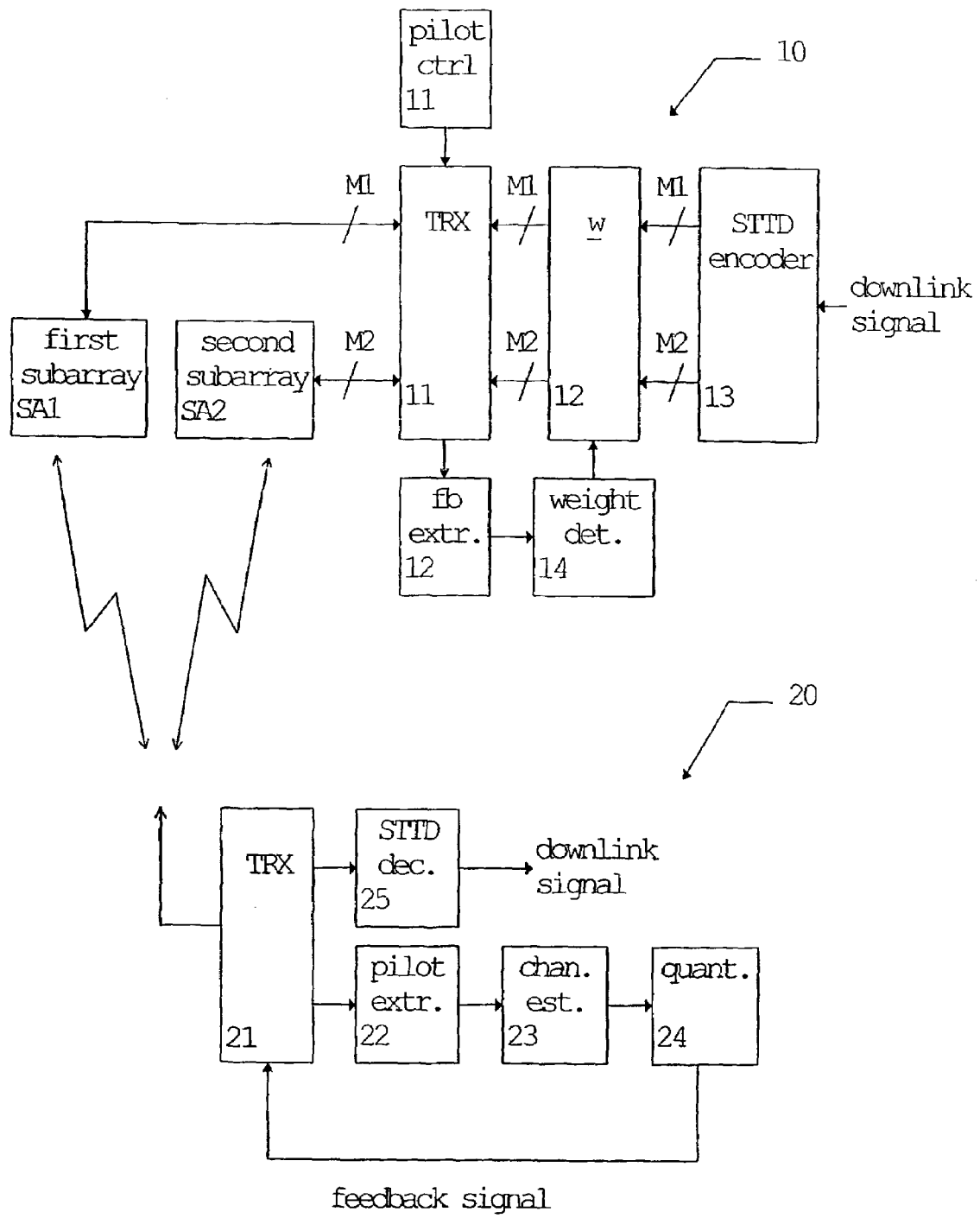
FIG. 3 shows a basic block diagram of a transmit diversity system according to the preferred embodiment of the present invention.

In the following, the preferred embodiment of the method and system according to the present invention will be described on the basis of wireless transmission between a base station 10 and a mobile station or terminal 20 of a WCDMA system. According to FIG. 3, the base station 10 comprises an antenna array which is split into a first subarray SA1 comprising M1 antenna elements and a second subarray SA2 comprising M2 antenna elements. The antenna elements of the two subarrays SA1 und SA2 are fed by a transceiver TRX 11 which supplies M1 parallel signals to the first subarray SA1 and M2 parallel signals to the second subarray SA2. The parallel signals are generated by an STTD encoder 13 which divides a downlink signal to be transmitted from the network to the terminal or mobile station 20 into two signal parts comprising the M1 and M2 parallel signals, respectively, according to a space-time coding scheme.

The M1 and M2 parallel signals of the two signal parts are supplied to the TRX 11 via a weighting unit 12 which applies predetermined transmit weights to at least a part of the parallel signals. The applied transmit weights may be complex weights, i.e. phase and amplitude of the parallel signals may be controlled by the weighting unit 12. The transmit weights are controlled by a weight determination unit 14 which sets the weights for individual ones of the parallel signals according to a feedback received by the TRX 11 via a corresponding feedback channel (e.g. FBI field of DPCCH of the WCDMA system). Individual feedback signals or weights are extracted by a feedback extracting unit 12 from the frame sequence received by the TRX 11 from the mobile station 20 and supplied to the weight determination unit 14. Thus, a closed-loop control is provided by controlling the transmit weights of individual ones of the M1 and/or M2 parallel signals based on the feedback information received from the mobile station 20.

Additionally, an open-loop control is achieved by the space-time division of the downlink signal in the STTD encoder 13, where the channel symbols of the transmission signals are divided into two-element blocks or signal parts which are transmitted after the weighting processing by the two subarrays SA1 and SA2.

It is to be noted that the weight determination unit 14 and the weighting unit 12 may be arranged such that only the parallel signals supplied to one of the first and second subarrays SA1 and SA2 are controlled. In this case, the transmission beam of one subarray is controlled according to an open-loop control scheme and the transmission beam of the second subarray SA2 is additionally controlled according to a closed-loop control scheme. Thereby, the feedback signaling capacity can be reduced.

The feedback information is generated at the mobile station 20 based on channel pilots (CPICH) transmitted from predetermined antenna elements of the first and second subarrays SA1 and SA2. The supply of the pilot signals to the predetermined antenna elements is controlled by a pilot control unit 11 which controls the TRX 11 so as to supply a corresponding pilot or training sequence to the respective pilot channels of the signals supplied to the predetermined antenna elements.

The mobile station 20 comprises a transceiver TRX 21 arranged to receive the signals transmitted from the antenna elements of the first and second subarrays SA1 and SA2 and to supply the received and superposed signals to a STTD decoder 25 which decodes or combines the received parallel signals or signal parts in order to obtain the original downlink signal, wherein the combined closed and open-loop transmit diversity scheme leads to a considerable diversity gain.

Furthermore, the mobile station 20 comprises a pilot extraction unit 22 arranged to extract or filter the pilot signals transmitted by the predetermined antenna elements via the pilot channels. The extracted pilot signals (e.g. pilot or training sequences) are supplied to a channel estimation unit 23 which performs a channel estimation according to known estimation procedures based on the pilot signal. The channel estimations are supplied to a quantization unit 24 which may operate according to one of the known closed-loop transmit diversity schemes, e.g. STD, TxAA modes 1 and 2, and SW-STTD).

Figures 1, 2:
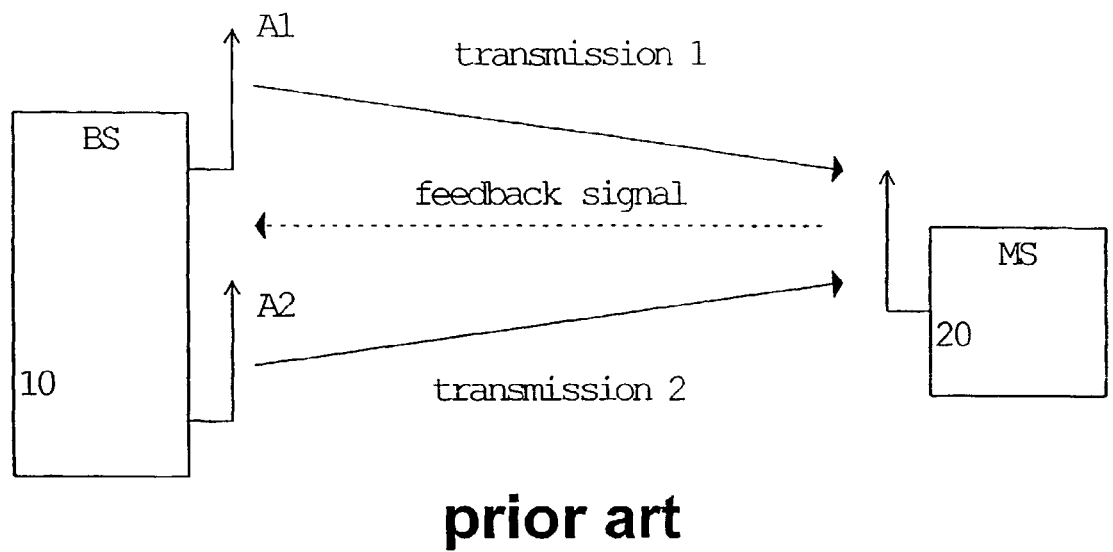
FIG. 1 shows a basic block diagram of a known closed-loop transmit diversity system comprising a base station and mobile station.
FIG. 2 shows a table indicating characteristic parameters of the known STD and TxAA modes.

The quantized feedback information or parameters (e.g. as indicated in FIG. 2) are supplied to the TRX 21 in order to be transmitted via the corresponding feedback channel (e.g. FBI field of the DPCCH) to the base station 10. Thus, the feedback is based on a quantizing of the measurement or estimation result obtained by the channel estimation unit 23.

It is to be noted that WCDMA terminals usually support only two measurement channels, however this is not critical, since the mobile station or terminal 20 does not need to know the architecture of the base station 10, but only faces certain probing channels. It is then up to the base station 10 to interpret the received feedback correctly.

In case the measurements at the mobile station 20 are based on two pilot channels, i.e. the mobile station 20 is capable of probing two pilot channels, two orthogonal codes or training sequences may be transmitted from two predetermined antenna elements of the first and second subarrays SA1 and SA2. Thus, pilot signals are transmitted only from two of the total number of antenna elements of the two subarrays SA1 and SA2. This may be accomplished by arranging the pilot control unit 11 so as to fix two antenna elements and transmit continuously from these two antenna elements. Preferably, the predetermined antenna elements may be arranged at the edges of the respective subarray. However, it is to be noted that any two antenna elements can be used.

Alternatively, the pilot control unit 11 can be arranged to change at least one antenna element between successive slots. For example, during a first slot, antenna elements A1 and A2 transmit pilots 1 and 2, during a second slot, antenna elements A1 and A3 transmit these pilots, and so on. This enables the mobile station 20 to measure the channels of all antenna elements while measurements or estimations are performed using only two pilot sequences. Furthermore, when one pilot channel is fixed to the antenna element A1, the mobile station 20 can estimate this channel continuously. However, any hopping pattern can be used for switching the second pilot.

Figure 4A:
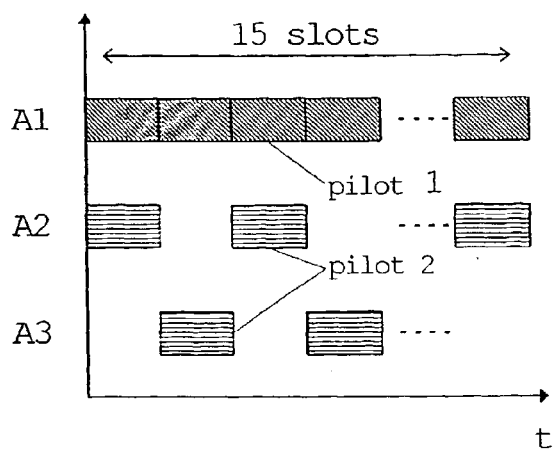
FIGS. 4A and 4B show time charts of pilot signalings in a switched mode and in a continues mode, respectively, according to the preferred embodiment of the present invention.

FIG. 4A shows a time diagram indicating a predetermined hopping pattern within a frame formed by 15 slots, which may be used in very slowly varying channels. The pilot 2 can hop from the antenna element A2 to the antenna element A3 and back after one slot, multiple slots, or after each frame. It is again noted that the base station 20 does not necessary need to know from which antenna element the pilot signals are transmitted, as long as the base station 10 knows the hopping pattern. Then, given any pilot hopping pattern, the base station 10 is able to interpret the received feedback signals in the correct way for each mobile station 20. The hopping pilot enables the mobile station 20 to calculate a feedback information θ of the respective transmit beam of the corresponding subarray based on the following equation:

$$\theta = \arg\min_{\theta} \|\hat{a} - w(\theta)\| \tag{1}$$

where $\hat{a}$ denotes the estimation of the downlink channel and w the parametrized array weight vector. Effectively, the mobile station 20 calculates the best fit between the measured channel (measured from the probing channels) and a parameterized channel manifold. Having calculated this feedback information θ, it is quantized in the quantization unit 24 and signaled back to the base station 10. The weight determination unit 14 of the base station 10 then determines and modifies the transmit weights accordingly, after the feedback signal has been detected or extracted by the feedback extraction unit 12. Thus, the multi antenna transmit diversity scheme can be reduced to a current two-element transmit diversity concept with two antennas.

Alternatively, the pilot control unit 11 may be arranged to transmit separate pilot signals via the pilot channels of all antenna elements of the respective subarray, so that all downlink channels can be estimated simultaneously. To achieve this, code-division-multiplexed pilot signals can be transmitted via the limited number of pilot channels which can be measured or estimated at the mobile station 20.

Figure 4B:
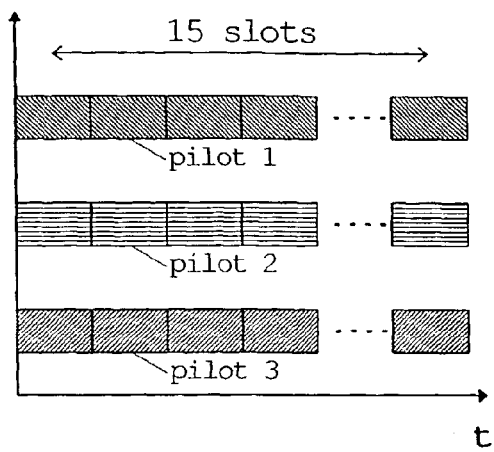

FIG. 4B shows a time diagram of such a continuous pilot transmission via code-division-multiplex pilot channels. Three pilots 1 to 3 are simultaneously transmitted via the pilot channel using different code sequences.

The transmitted feedback information may be used to define relative weights between all antenna elements of the respective subarray. Thus, in case of M controlled antenna elements, M−1 feedback weights are signaled sequentially to the base station 10 in order to control the relative weights between all antenna elements. Thereby, only a small change to the current WCDMA system is required. However, due to the long control delay required for transmitting all relative weights, this closed-loop control is only beneficial for very slowly fading channels.

According to a parameterized/structured-array beamforming concept, a feedback signal may be used which jointly determines the transmit "direction" or weight for all antenna elements of a respective subarray. The same relative phase between all neighboring antenna elements is then used, and this phase is calculated by the mobile station 20 based on command channel measurements using two or more pilot channels. The transmit beam, parameterized by the feedback information θ, is then given by the following equation:

$$\underline{w} = \begin{bmatrix} 1 \\ e^{(j2\pi d \sin(\theta))/\lambda} \\ \vdots \\ e^{(j2\pi(M-1)d\sin(\theta))/\lambda} \end{bmatrix} \tag{2}$$

wherein the terms in brackets indicate the complex weights $w_1, w_2, \ldots w_M$, respectively, of the antenna elements of the controlled subarray, d denotes the distances between neighboring antenna elements, λ denotes the wavelength of the parallel transmission signals, and M denotes the number of antenna elements in the subarray. Thus, only one coefficient is signaled to the network (base station 10), which leads to a reduced control delay. However, in certain channels, the parameterized model may not match the transmission channel. Therefore, an inherent trade-off between control delay and weight parameterization is usually given.

It is to be noted, that the transmit weights may as well be determined so as to control the gain of different antenna elements. Then, the above equation (2) can be written as $$\underline{w}(\theta) = \begin{bmatrix} 1 \\ g_2 e^{(j2\pi d \sin(\theta))/\lambda} \\ \vdots \\ g_M e^{(j2\pi(M-1)d\sin(\theta))/\lambda} \end{bmatrix} \tag{3}$$

wherein the gain parameters $g_1, g_2, \ldots g_M$ define the length of the complex weight arrow in the complex plain. Thus, the transmission power supplied to individual antenna element can be controlled by the weighting unit 12. It is to be noted that equation (1) may be calculated for each slot using the parametrization given by equations (2) or (3).

In particular, when the WCDMA FSM message is used with both gain and phase control bits, $g_1$ and $g_M$ can be assigned according to the feedback gain information, while the gains $g_2, \ldots g_{M-1}$ for the other antenna elements are interpolated e.g. in a linear manner. For example, if the gain $g_1$ is signaled to the antenna A1 and the gain $g_M$ is signaled to the antenna AM, the power or gain for the other antenna elements arranged between the antenna elements A1 and AM can be set e.g. according to the following equation $$g_m = g_1 + (m-1)(g_M - g_1)/(M-1) \tag{4}$$

wherein m indicates the number or index of an individual antenna element for which the gain is interpolated. Naturally, the gains can be normalized in any desired way. However, it is to be noted that any interpolation can be applied to determine the remaining gains, e.g. quadratic, or cubic normalization.

Interpolation techniques are preferred in cases where the antenna elements can be assumed to be correlated. The antenna correlation depends in practice on a number of issues. Typically, the correlation is high and there is little spatial aliasing, when the antenna elements are close to each other (e.g. half the wavelength). Furthermore, the channels faced by the antenna elements are less correlated in the presence of a multipath propagation. Multipath-rich environments are likely to suffer from performance degradation, since the interpolated weights may not add up coherently to the received signal at the base station 20. This problem can be alleviated by enabling the mobile station 20 to probe all M channels e.g. with a hopping pilot.

It is as well possible to feedback M−1 weights to the base station 10 and let the weight determination unit 14 decide how to filter these weights. If these successive weights are transmitted e.g. sequentially, the weight determination unit 14 can decide based on received statistics if these weights are correlated and then fit an appropriate linear or non-linear model to enhance the weights. For example, if the parallel signals are transmitted with a phased array with elements close to each other, the feedback signals describing neighboring phase offsets (relative transmit weights) would be highly correlated. Thus, the weight determination unit 14 can filter these relative feedback weights in order to determine a transmit weight jointly for all M antenna elements. In this case, the mobile station 20 operates without any knowledge of the antenna structure at the base station 10, and the base station 10 determines the filtering operation based on receipt signal statistics (e.g. correlation of antenna elements), or based on an a priori knowledge of the antenna structure. However, any method which enables the mobile station 20 to calculate M−1 feedback signals can be used for defining the downlink probing/pilot channels.

Thus, the preferred embodiment of the present invention allows to calculate optimum transmit weights regardless of antenna correlation, while still using a low capacity feedback channel, enabled by a parameterized array manifold. The signal is separated into (at least) two signal parts of parallel signals, where each signal part is separable by a suitable decoding or detection technique. A feedback information is determined for at least one subchannel. The subchannel may be defined as M different antennas, or M different linear combinations of signals transmitted by M' different antenna elements. M and M' need not necessarily be the same. Besides the described STTD scheme, any other technique for dividing the signal into any number of signal parts is possible, e.g. delay diversity, space-time trellis coding, coded substreams, space-time block coding with more than two transmitting antennas, etc. Furthermore, assuming that the first signal is transmitted using M1 antenna elements and the second signal part is transmitted using M2 antenna elements, partly or even fully overlapping subarrays may be used, i.e. M1+M2>M. That is, one antenna element or even all antenna elements may belong to both subarrays. In this case, the subarrays would generate differently directed beams.

In case beam-space STTD is used, the received signal is given by the following equation $$\begin{bmatrix} z[2n] \\ z[2n+1] \end{bmatrix} = \begin{bmatrix} s[2n] & s[2n+1] \\ -s*[2n+1] & s*[2n] \end{bmatrix} \begin{bmatrix} w_1^t \\ w_2^t \end{bmatrix} \begin{bmatrix} h_1 \\ h_2 \\ \vdots \\ h_M \end{bmatrix} + \begin{bmatrix} z[2n] \\ z[2n+1] \end{bmatrix} \quad (5)$$

wherein $h_m$ denotes a channel coefficient between the mobile station 20 and the antenna $A_m$, and $w_j^t$ denotes a feedback weight transmitted at at time instant t via feedback channel j, the matrix describes the known STTD coding processing, and the added signal n describes the received noise.

According to the preferred embodiments, at least one of the beams transmitted by the two subarrays SA1 and SA2 is optimized using the feedback information from the mobile station 20 to the base station 10.

According to a constrained beam forming concept, the two beams transmitted from the subarrays SA1 and SA2, respectively, are a priori constrained in a particular way. The use of such constrained beams allows to reduce the feedback link capacity. To achieve this, one of the two beams may be controlled so as to be always orthogonal or correlated in a known way to the other beam, wherein the one beam is controlled by the feedback information possibly taking into account the known beam correlations. In a 4-antenna realization, the first beam may be a priori restricted to be e.g. in the subspace spanned by antenna elements A1 and A2, and the second beam would be in the subspace spanned by the antenna elements A3 and A4. In this example, at least one of the beams is changed based on feedback. For example, the second beam need not be changed at all by feedback, if the first beam is modified. The first beam may be optimized by using any feedback mode. In a corresponding 3-antenna realization, the weights $w_1$ and $w_2$ for the first beam and second beam, respectively, could be chosen according to the following equations $$\underline{w}_1 = \begin{bmatrix} 1 \\ e^{j\theta} \\ 0 \end{bmatrix}, \underline{w}_2 = \begin{bmatrix} 0 \\ 0 \\ 1 \end{bmatrix}, \quad (6)$$

wherein each vector element denotes a weight supplied to one of the three antennas A1 to A3. Thus, the first beam is controlled by supplying an uncontrolled signal to the antenna element A1, a phase-controlled signal to the antenna element A2, and no signal to the antenna element A3. The second beam is generated by solely supplying an uncontrolled signal to the antenna element A3. Any two-antenna feedback mode may be used for controlling the first beam.

According to a more complex realization (for any number of antenna elements), the first beam may have components in all antenna directions, or at least M1+M2>M. The feedback information may be used to control any number of weights from 1 to 2(M1−1), utilizing a generalization of any 2-antenna feedback mode to optimize the beam in question. The other beam is automatically kept orthogonal to the controlled beam. This can be achieved by a corresponding weight control performed in the weight determination unit 14. This concept may preferably be combined with the SW-STTD concept initially described, i.e. when the quality of the feedback is judged to be good and the controlled beam approaches an optimum beam, the weight of this beam is increased.

According to another example, the first beam may be selected to transmit to all directions covered by M elements, using e.g. a space-time block code, and the second beam may be controlled by feedback according to any of the initially described weight control techniques. Furthermore, one dimension (parallel signal) of the space-time code can be assigned to Tx-AA (with feedback-based weight control) and the remaining M−1 dimensions (parallel signals) may be assigned to conventional space-time transmissions (leading to a diversity M−1 for space-time transmission alone). The transmit power of these two parallel transmissions can be controlled either with or without feedback.

According to a partially blind beam forming concept, a diversity beam may be formed using received uplink signals without explicit feedback at the base stations 10, while another beam can be optimized using feedback. The dynamics of the diversity beam may differ from those of the feedback-optimized beam. For example, the blind diversity beam may changed at frame resolution (e.g. 10 ms) and the feedback beam may changed 15 times during one frame (i.e. with each slot).

Figure 5:
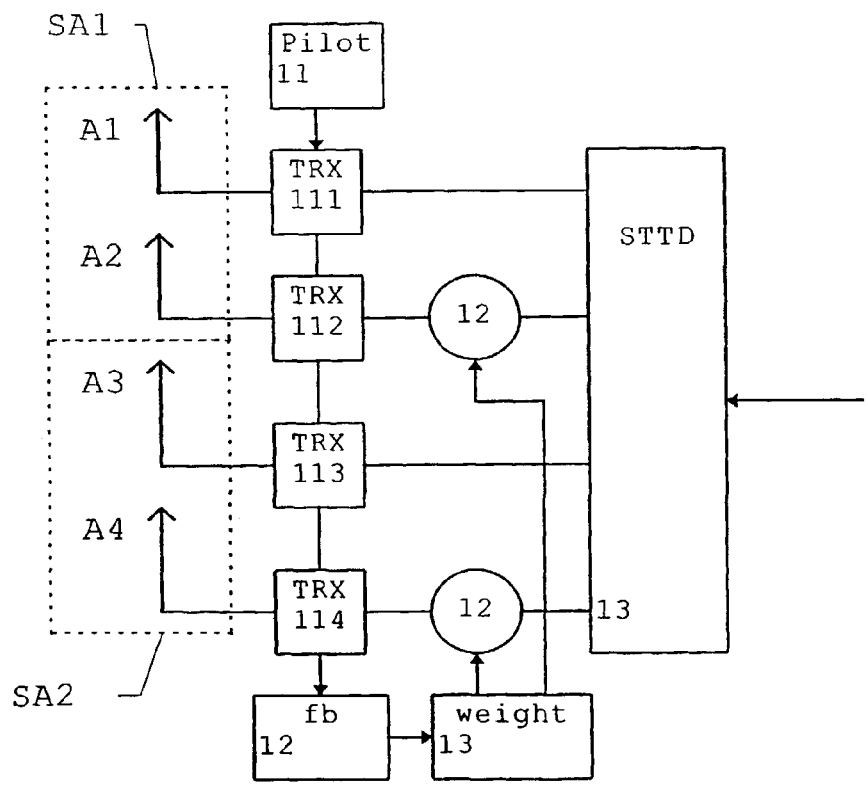
FIG. 5 shows a basic block diagram of an example of the preferred embodiment of the present invention based on two subarrays each with two antenna elements.

FIG. 5 shows a further example of the preferred embodiment where each of the first and second subarrays SA1 and SA2 comprises two antenna elements. The antenna elements A1 to A4 are fed by respective transceivers TRX 111 to 114. Furthermore, weighting units 12 are provided in the transmission paths leading to the antenna elements A2 and A4, wherein the weight determination unit 13 is arranged to control the weighting units 12 so as to apply a predetermined weight to the parallel signal supplied to the antenna element A4 and another predetermined weight to the parallel signal supplied to the antenna element A1. The weighting units 12 may comprise known controllable attenuation elements or networks and/or known controlled delay or phase shifting networks or elements, so as to achieve the required gain and/or phase shift. In the example shown in FIG. 5, the two subarrays SA1 and SA2 each with two antenna elements A1, A2 and A3, A4, respectively, can be controlled separately using any two-antenna feedback mode. The transmission from the antenna elements A1 and A3 is performed with a weight "1", while the phases and/or gains of the antenna elements A2 and A4 are controlled via feedback. This can be described by the following equations:

$$\underline{w}_1 = \begin{bmatrix} 0 \\ 0 \\ 1 \\ e^{j\theta_1} \end{bmatrix}, \underline{w}_2 = \begin{bmatrix} 1 \\ e^{j\theta_2} \\ 0 \\ 0 \end{bmatrix} \quad (7)$$

where $\underline{w}_1$ indicates the complex weight vector used to control the first beam, and $\underline{w}_2$ indicates the complex weight vector used to control the second beam. As can be gathered from the above equation, the first and second beams are orthogonal, since different dimensions of the vectors are controlled, i.e. a change of the antenna elements A1 and A2 leads to a change in the second beam but not to a change in the first beam. The relative gains of the subarrays SA1 and SA2 may be controlled in place or in addition to the control of the phases.

The feedback information can be calculated in such a manner that a joint feedback command is obtained based on common pilots, whereas the signal parts are transmitted individually from the subarrays SA1 and SA2. For example, the beams may be chosen as defined in equation (6), but only one common feedback information may be transmitted from the mobile station 20 to the base station 10. Usually, the aim of the feedback is to maximize the sum of the squared receiving powers of the two beams. Then, e.g. $\theta_1 = \theta_2$ may be applied in the above equation (7).

According to a further example, dedicated beams could be formed based on common pilots of the antenna elements A1 and A4. Then, the first signal part may be transmitted from these two elements (forming the first subarray SA1), and the second signal part may be transmitted from the middle antenna elements A2 and A3 (forming second subarray SA2) using the same relative phase offset between all neighboring elements. Hence, the phases for the middle antenna elements A2 and A3 are interpolated from the other elements. In this case, it is assumed that the antenna elements A1 to A4 are placed at equal distances and that the antenna elements A1 and A4 are arranged at the edges of the whole antenna array.

In the preferred embodiment, the STTD encoder 13 may be arranged so as to provide a dynamic mode change based on the correlation of the signals transmitted from or received by the antenna elements of the subarrays SA1 and SA2. This determination may be performed at the mobile station 10 or at the base station 20. In particular, when it is determined that the signals are highly correlated, the division into the two signal parts can be omitted or suppressed and one of the coded or divided signal parts can be transmitted using a single beam generated by M elements. A weight verification can be added such that the mobile station 20 may derive whether beam diversity or single-beam transmission is applied.

In summary, the present invention relates to a method and system for transmitting a transmission signal via an antenna array to a receiving means 20 of a wireless communication system, wherein a transmission signal is divided into at least two signal parts which are transmitted by using transmission beams of at least two subarrays SA1, SA2 of the antenna array. The transmission beam of at least one of the at least two subarrays SA1, SA2 is at least in part controlled based on a feedback information received from the receiving means 20. Thus, several beams are generated using an antenna array with more than two antennas, wherein an open-loop diversity is used to split the transmission between the beams, and a closed-loop feedback-based diversity is used to optimize the beams, as well as possibly the division of power between the beams. Thereby, the amount of feedback can be controlled so as to achieve significant feedback gain in a multi-antenna transmission even with non-maximal amounts of feedback.

The present invention is not limited to the above preferred embodiments but can be applied to any multi-antenna transmitter in order to provide an increased system capacity. As already mentioned, any kind of division scheme can be used, provided the downlink signal can be recovered at the mobile station 20. The feedback signaling can be performed according to any signaling or quantization concept suitable for obtaining transmit weights at the base station 10.

Moreover, the present invention may be applied to any wireless communication system comprising a transmit diversity or transmit beam forming concept used between a transmitting element and at least one receiver. Therefore, the above description of the preferred embodiment and the accompanying drawings are only intended to illustrate the present invention. The preferred embodiment of the invention may be varied within the scope of the attached claims.

What is claimed is:

1. A method for transmitting a transmission signal via an antenna array to a receiving unit of a wireless communication system, comprising:
   dividing said transmission signal into at least two signal parts;
   transmitting said at least two signal parts by using transmission beams of at least two subarrays of said antenna array;
   controlling the transmission beams of at least one of said two subarrays at least in part based on feedback information received from said receiving unit;
   detecting channel characteristics of a transmission channel; and
   changing a predetermined hopping pattern based on the detected channel characteristics of the transmission channel;
   wherein said feedback information is generated based on a channel measurement using pilot channels of predetermined antenna elements of at least one of said at least two subarrays, a number of predetermined antenna elements being smaller than a total number of the antenna elements, and the receiving unit measuring the channels of all antenna elements of the antenna array based on channel measurements using only the pilot channels of the predetermined antenna elements; and
   wherein at least one of said predetermined antenna elements changes between slots of said transmission signal according to the predetermined hopping pattern.

2. The method according to claim 1, wherein at least one of said predetermined antenna elements is fixed and controlled to transmit continuously via said pilot channels.

3. The method according to claim 2, wherein at least one of said predetermined antenna elements is arranged at edges of at least one of said at least two subarrays.

4. The method according to claim 1, wherein said pilot channels are code-division multiplexed channels.

5. The method according to claim 1, wherein said feedback information comprises M−1 feedback weights that are used to control relative weights between all M antenna elements of at least one of said at least two subarrays.

6. The method according to claim 5, wherein said feedback weights are filtered after reception at a transmission side.

7. The method according to claim 1, wherein said feedback information determines at least one of a transmit direction and weight jointly for all antenna elements of at least one of said at least two subarrays, wherein a same relative phase is used between neighboring antenna elements.

8. The method according to claim 1, wherein said feedback information comprises weight information for a part of antenna elements of at least one of said at least two subarrays, wherein the weight information for a remaining part of said antenna elements is interpolated.

9. The method according to claim 1, wherein said transmission signal is divided by using a space-time transmit diversity processing, a delay diversity processing, a space-time trellis coding, coded substreams, or a space-time block coding.

10. The method according to claim 1, wherein another transmission beam of another one of said at least two subarrays is correlated to said transmission beam of said one of said at least two subarrays.

11. The method according to claim 10, wherein said other transmission beam is formed without feedback by using received uplink signals.

12. The method according to claim 1, wherein said at least two subarrays each comprise two antenna elements, one of which being controlled by a feedback weight derived from said feedback information.

13. The method according to claim 1, wherein said feedback information is a common feedback calculated based on common pilots.

14. The method according to claim 1, wherein said dividing step is suppressed and the transmission is performed by a single transmission beam, if it is determined that the signals from or to the antenna elements of said antenna array are highly correlated.

15. A system for transmitting a transmission signal via an antenna array to a receiving unit of a wireless communication system, comprising:
a dividing unit for dividing said transmission signal into at least two signal parts;
a transmitting unit for transmitting said at least two signal parts by using transmission beams of at least two subarrays of said antenna array;
a control unit for controlling the transmission beam of at least one of said at least two subarrays at least in part based on feedback information received from said receiving unit; and
a pilot control unit for changing at least one of said predetermined antenna elements between slots of said transmission signal according to a predetermined hopping pattern which is changed based on detected channel characteristics of a channel;
wherein said system is configured to generate said feedback information based on a channel measurement using pilot channels of predetermined antenna elements of at least one of said at least two subarrays, a number of predetermined antenna elements is smaller than a total number of the antenna elements, and the receiving unit measures the channels of all antenna elements of the antenna array based on channel measurements using only the pilot channels of the predetermined antenna elements.

16. The system according to claim 15, wherein said pilot control unit generates pilot signals transmitted via pilot channels of predetermined antenna elements of at least one of said at least two subarrays.

17. The system according to claim 16, further comprising a feedback extraction unit for filtering said feedback information and for supplying the filtered feedback information to a weight determination unit of said control unit.

18. The system according to claim 15, further comprising a feedback extraction unit for filtering said feedback information and for supplying filtered feedback information to a weight determination unit of said control unit.

19. The system according to claim 18, wherein said feedback information determines at least one of a transmit direction and weight jointly for all antenna elements of at least one of said at least two subarrays, and wherein said weight determination unit is configured to use a same relative phase between neighboring antenna elements.

20. The system according to claim 18, wherein said weight determination unit is configured to interpolate a weight information of a part of antenna elements of at least one of said at least two subarrays.

21. The system according to claim 20, wherein said dividing unit is configured to divide said transmission signal by using a space-time transmit diversity processing, a delay diversity processing, a space-time trellis coding, coded substreams, or a space-time block coding.

22. The system according to claim 15, wherein said dividing unit is configured to divide said transmission signal by using a space-time transmit diversity processing, a delay diversity processing, a space-time trellis coding, coded substreams, or a space-time block coding.

23. The system according to claim 15, wherein said control unit is configured to correlate another transmission beam of another one of said at least two subarrays to said transmission beam.

24. The system according to claim 23, wherein said control unit is configured to form said other transmission beam without feedback by using received uplink signals.

25. The system according to claim 15, wherein said dividing unit is configured to suppress the division and to supply an output signal to said antenna array in order to be transmitted by a single transmission beam, if it is determined that signals from or to the antenna elements of said antenna array are highly correlated.

26. The system according to claim 15, wherein said at least two subarrays comprise overlapping subarrays having at least one antenna element which belongs to each of the overlapping subarrays.

27. The system according to claim 15, wherein said transmission is performed between a base station and a mobile station of a WCDMA system.

28. A network device for transmitting a signal via an antenna array to a mobile terminal, said network device comprising:
a dividing unit for dividing said transmission signal into at least two signal parts;

a transmitting unit for transmitting said at least two signal parts by using transmission beams of at least two subarrays of said antenna array;

a control unit for controlling the transmission beam of at least one of said at least two subarrays at least in part based on feedback information received from said mobile terminal; and a pilot control unit for changing at least one of said predetermined antenna elements between slots of said transmission signal according to a predetermined hopping pattern which is changed based on detected channel characteristics of a channel;

wherein said network device is configured to receive generated feedback information which is based on a channel measurement using pilot channels of predetermined antenna elements of at least one of said at least two subarrays, a number of predetermined antenna elements is smaller than a total number of the antenna elements, and the receiving unit measures the channels of all antenna elements of the antenna array based on channel measurements using only the pilot channels of the predetermined antenna elements.

29. The network device according to claim 28 wherein the network device is a base station.

30. A terminal device for receiving a transmitted signal from a network device, comprising:

a downlink signal pilot extraction unit for extracting or filtering pilot signals transmitted by predetermined antenna elements of at least two subarrays via pilot channels;

a channel estimation unit for performing a channel estimation based on the extracted pilot signals;

a quantization unit for receiving the channel estimation and generating quantized feedback information for transmission to the network device;

a transceiver unit for transmitting the generated feedback information to the network device; and a space time transmit diversity decoder (STTD) unit for decoding at least two signal parts transmitted from the network element based on an STTD decoding scheme;

wherein said feedback information is generated based on a channel measurement using said pilot channels of the predetermined antenna elements of at least one of said at least two subarrays, a number of predetermined antenna elements is smaller than a total number of the antenna elements, and the receiving unit measures the channels of all antenna elements of the antenna array based on channel measurements using only the pilot channels of the predetermined antenna elements; and wherein at least one of said predetermined antenna elements changes between slots of said transmitted signal according to a predetermined hopping pattern which is changed based on detected channel characteristics of a transmission channel.

31. The terminal device of claim 30, wherein the terminal device is a mobile station.

* * * * *